United States Patent
Shan et al.

(10) Patent No.: US 12,103,781 B2
(45) Date of Patent: Oct. 1, 2024

(54) CHAIN CONVEYING MECHANISM AND ARTICLE SORTING SYSTEM

(71) Applicant: BEIJING JINGDONG QIANSHI TECHNOLOGY CO., LTD., Beijing (CN)

(72) Inventors: Wenjun Shan, Beijing (CN); Mingfu Wu, Beijing (CN); Guoku Song, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 92 days.

(21) Appl. No.: 18/245,958

(22) PCT Filed: Mar. 23, 2021

(86) PCT No.: PCT/CN2021/082453
§ 371 (c)(1),
(2) Date: Mar. 20, 2023

(87) PCT Pub. No.: WO2022/057228
PCT Pub. Date: Mar. 24, 2022

(65) Prior Publication Data
US 2023/0365336 A1 Nov. 16, 2023

(30) Foreign Application Priority Data
Sep. 21, 2020 (CN) .......................... 202010997442.3

(51) Int. Cl.
*B65G 17/06* (2006.01)
*B65G 17/12* (2006.01)
(Continued)

(52) U.S. Cl.
CPC ............ *B65G 17/067* (2013.01); *B65G 17/12* (2013.01); *B65G 17/42* (2013.01); *B65G 17/345* (2013.01)

(58) Field of Classification Search
CPC .... B65G 17/067; B65G 17/42; B65G 17/345; B65G 17/34; B65G 47/96; B65G 17/12;
(Continued)

(56) References Cited

U.S. PATENT DOCUMENTS 3,662,874 A    5/1972  Muller
5,060,779 A *  10/1991 Landaeus ............. B65G 17/123
                                                         198/321

(Continued)

FOREIGN PATENT DOCUMENTS

CN    1785767 A    6/2006
CN    104411603 A   3/2015
(Continued)

OTHER PUBLICATIONS

"Notice of Reasons for Refusal" and English language translation, JP Application No. 2022-572761, Apr. 30, 2024, 13 pp.
(Continued)

*Primary Examiner* — Mark A Deuble
(74) *Attorney, Agent, or Firm* — Myers Bigel, P.A.

(57) ABSTRACT

The present disclosure relates to the technical field of sorting, and in particular to a chain conveying mechanism and an article sorting system. The chain conveying mechanism provided by the present disclosure includes: a chain transmission mechanism, including a chain and a sprocket, wherein the chain is driven by the sprocket to rotate; a cart, arranged on the chain and rotating along with the chain, wherein the cart includes a cart body and two wheel groups connected to two opposite sides of the cart body, and each of the wheel groups includes a first wheel and a second
(Continued)

wheel arranged intervals on the same side of the cart body; and linkage mechanisms being in one-to-one correspondence with the wheel groups, wherein each of the linkage mechanisms connects the chain with the first wheel and the second wheel, and enables the first wheel and the second wheel to swing relative to each other to change a distance between the first wheel and the second wheel. On such basis, the turning stability of the cart at the sprocket is effectively improved.

15 Claims, 4 Drawing Sheets

(51) Int. Cl.
*B65G 17/42* (2006.01)
*B65G 17/34* (2006.01)

(58) Field of Classification Search
CPC ........ B65G 17/30; B65G 17/48; B65G 23/06; B65G 17/068; B65G 17/065; B65G 17/066; B65G 17/123; B65G 17/126; B65G 17/14
See application file for complete search history.

(56) References Cited

U.S. PATENT DOCUMENTS

| | | | | |
|---|---|---|---|---|
| 6,834,754 | B2* | 12/2004 | Pietz | B66B 23/02 198/834 |
| 7,063,202 | B2* | 6/2006 | Ossendorf | B66B 23/026 198/321 |
| 7,926,641 | B2* | 4/2011 | Gonzalez Alemany | B65G 23/16 198/330 |
| 9,227,788 | B2* | 1/2016 | Voigt | B65G 17/44 |
| 9,718,646 | B2* | 8/2017 | Srb-Gaffron | B66B 23/022 |
| 9,862,575 | B2* | 1/2018 | Schulz | B65G 17/24 |
| 10,308,482 | B2* | 6/2019 | Michalke | B66B 23/12 |
| 10,464,759 | B2* | 11/2019 | Lykkegaard | B65G 21/22 |
| 10,683,192 | B2* | 6/2020 | Michalke | B66B 21/10 |
| 11,479,446 | B2* | 10/2022 | Praxmarer | B65G 17/40 |
| 2015/0360869 | A1 | 12/2015 | Bastian et al. | |
| 2016/0236870 | A1 | 8/2016 | Parodi et al. | |
| 2017/0081126 | A1 | 3/2017 | Schirle et al. | |
| 2021/0297873 | A1* | 9/2021 | Buel | H04B 7/0695 |

FOREIGN PATENT DOCUMENTS

| | | | |
|---|---|---|---|
| CN | 204624521 U | 9/2015 | |
| CN | 205076405 U | 3/2016 | |
| CN | 108311399 A | 7/2018 | |
| CN | 110406907 A | 11/2019 | |
| CN | 110406909 A | 11/2019 | |
| CN | 210762701 U | 6/2020 | |
| CN | 210847215 U | 6/2020 | |
| CN | 111661560 A | 9/2020 | |
| GB | 1035583 A | 7/1966 | |
| JP | S5285293 U | 6/1977 | |
| JP | S5490776 A | 7/1979 | |
| JP | 2004277113 A | 10/2004 | |
| JP | 2014084182 A | 5/2014 | |
| WO | WO-2020088998 A1 * | 5/2020 | ............. B65G 17/40 |

OTHER PUBLICATIONS

"First Office Action and English language translation", CN Application No. 202010997442.3, Apr. 1, 2022, 10 pp.

"International Search Report and Written Opinion of the International Searching Authority with English language translation", International Application No. PCT/CN2021/082453, Jun. 21, 2021, 13 pp.

* cited by examiner

CHAIN CONVEYING MECHANISM AND ARTICLE SORTING SYSTEM

CROSS-REFERENCE TO RELATED APPLICATIONS

The present application is a U.S. National Stage Application under 35 U.S.C. § 371 of International Patent Application PCT/CN2021/082453, filed on Mar. 23, 2021, which is based upon and claims priority to Chinese Patent Application No. 202010997442.3, filed on Sep. 21, 2020, the entire contents of both of which are incorporated herein by reference.

TECHNICAL FIELD

The present disclosure relates to the technical field of sorting, and in particular to a chain conveying mechanism and an article sorting system.

BACKGROUND OF THE INVENTION

In some systems, for example, in a linear article sorting system, a cart is dragged by a chain. When arriving at a sprocket, the cart turns along a circumferential direction of the sprocket so as to complete transfer between different layers.

In related art, turning ability of the cart at the sprocket is low, which is prone to aggravate wear and noise, so improvement is urgently needed.

SUMMARY OF THE INVENTION

A technical problem to be solved by the present disclosure is to improve turning stability of a cart at a sprocket.

To solve the above technical problem, the present disclosure provides a chain conveying mechanism, including:
  a chain transmission mechanism, including a chain and a sprocket, wherein the chain is configured to be driven by the sprocket to rotate;
  a cart, arranged on the chain and rotatable along with the chain, wherein the cart includes a cart body and two wheel groups connected to two opposite sides of the cart body, and each of the wheel groups includes a first wheel and a second wheel arranged at intervals on the same side of the cart body; and
  linkage mechanisms being in one-to-one correspondence with the wheel groups, wherein each of the linkage mechanisms connects the chain with the first wheel and the second wheel, and enables the first wheel and the second wheel to swing relative to each other to change a distance between the first wheel and the second wheel.

In some embodiments, the linkage mechanism includes a supporting base, a swing arm, a first shaft and a second shaft, the supporting base is located between the chain and the wheel group and is connected to the cart body, the first shaft passes through the supporting base and connects the chain with the first wheel, a first end of the swing arm is connected to the supporting base in a swinging manner, and the second shaft passes through a second end, opposite to the first end, of the swing arm and connects the chain with the second wheel.

In some embodiments, the linkage mechanism includes a swing shaft, the swing shaft is rotatably connected to the supporting base, and the swing shaft is connected to the first end of the swing arm in a non-rotatable manner.

In some embodiments, the first end of the swing arm is provided with a connecting hole, one end, away from the cart body, of the connecting hole is oblong, the swing shaft includes an oblong part, and the oblong part cooperates with one end, away from the cart body, of the connecting hole to realize non-rotatable connection between the swing shaft and the first end of the swing arm.

In some embodiments, the supporting base is provided with a limiting part, and the limiting part limits a swinging displacement of the swing arm.

In some embodiments, the limiting part includes a limiting groove, a side wall of the limiting groove is provided with a notch, the first end of the swing arm is accommodated in the limiting groove; the second end of the swing arm extends out from the notch, and the side wall of the limiting groove limits the swinging displacement of the swing arm.

In some embodiments, the linkage mechanism includes a third shaft and a fourth shaft, and the supporting base is connected to the cart body through the third shaft and the fourth shaft.

In some embodiments, the supporting base is provided with a connecting column, a first hole part and a second hole part, the linkage mechanism includes a cooperation base and a limiting piece, the cooperation base is provided with a through hole, a third hole part and a fourth hole part, the connecting column is inserted into the through hole in a non-rotatable manner, the third hole part cooperates with the first hole part to form a closed first mounting hole, the fourth hole part cooperates with the second hole part to form a closed second mounting hole, the third shaft and the fourth shaft are respectively inserted into the first mounting hole and the second mounting hole, and the limiting piece limits axial displacements of the third shaft and the fourth shaft.

In some embodiments,
  the connecting column is provided with a protruded part, the protruded part extends towards a radial outer side of the connecting column from the connecting column, the through hole is provided with a groove, the groove is recessed towards a radial outer side of the through hole from a side wall of the through hole, and the protruded part cooperates with the groove to limit relative rotation of the connecting column and the through hole; and/or,
  the limiting piece includes a body portion, a first clamping ring and a second clamping ring, the body portion is clamped on the cooperation base, and the first clamping ring and the second clamping ring are arranged on the body portion and are respectively clamped on the third shaft and the fourth shaft so as to limit the axial displacement of the third shaft and the fourth shaft.

In some embodiments, the chain conveying mechanism includes a guide rail, wherein the guide rail is arranged at the sprocket and bears the wheel group when the cart turns along a circumferential direction of the sprocket.

In some embodiments, the guide rail includes at least one of the following:
  a first track, located between the sprocket and the chain, at least partially located above the center of the sprocket, and including a first arc-shaped section extending along a circumferential direction of the sprocket;
  a second track, located on one side, away from the sprocket, of the chain, at least partially located below the center of the sprocket, and including a second arc-shaped section extending along a circumferential direction of the sprocket.

In some embodiments, the guide rail includes the first track and the second track, and the first arc-shaped section and the second arc-shaped section are staggered in the circumferential direction of the sprocket.

In some embodiments, the first track includes a first straight section, and the first straight section is connected to one end, away from an outer side of the sprocket, of the first arc-shaped section; and/or, the second track includes a second straight section, and the second straight section is connected to one end, away from an outer side of the sprocket, of the second arc-shaped section.

In some embodiments, the cart is a sorting cart.

In addition, the present invention further provides an article sorting system, including the chain conveying mechanism according to each embodiment of the present disclosure.

The linkage mechanisms are arranged in the chain conveying mechanism and are used to make the distance between the adjacent first and second wheels on the same side of the cart adjustable, so that the turning stability of the cart at the sprocket is effectively improved.

Other features and advantages of the present disclosure will become apparent by the detailed description for exemplary embodiments of the present disclosure with reference to the following accompany drawings.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description are merely some embodiments of the present disclosure, and a person of ordinary skill in the art may still derive other drawings from these accompanying drawings without creative efforts.

DETAILED DESCRIPTION OF THE EMBODIMENTS

The technical solutions in the embodiments of the present disclosure are described clearly with reference to the accompanying drawings in the embodiments of the present disclosure. Apparently, the described embodiments are merely a part rather than all of the embodiments of the present disclosure. The following description of the at least one exemplary embodiment is actually merely illustrative and never constitutes any limitation to the present disclosure and application or use thereof. All other embodiments obtained by those of ordinary skill in the art based on the embodiments of the present disclosure without any creative efforts shall fall within the protection scope of the present disclosure.

Technologies, methods and devices known to those of ordinary skill in the related field may not be discussed in detail, but, where appropriate, the technologies, methods and devices should be regarded as a part of the authorized specification.

In the description of the present disclosure, it should be understood that an azimuth or position relationship indicated by azimuth words "front, rear, upper, lower, left, right", "transverse, longitudinal, vertical, horizontal", "top, bottom" and the like is generally an azimuth or position relationship based on the accompanying draws, which is only for facilitating description of the present disclosure and simplifying description. In the absence of a statement to the contrary, these azimuth words do not indicate and imply that the referred device or component must have a specific azimuth or perform construction and operation in the specific azimuth; therefore, it cannot be interpreted as a limitation to the protection scope of the present disclosure. The azimuth words "inner, outer" refer to the inside and outside relative to the outline of each component itself.

In the description of the present disclosure, it should be understood that the words "first", "second" and the like for limiting parts are merely for convenience of distinguishing corresponding parts. Unless otherwise stated, the above words do not have special meanings and cannot be construed as limitations to the protection scope of the present disclosure.

In addition, the technical features involved in the different embodiments of the present invention described below may be combined with each other as long as they do not constitute a conflict with each other.

FIG. 1 to FIG. 11 exemplarily show the structure of a chain conveying mechanism according to the present disclosure.

The chain conveying mechanism 10 is widely used in equipment such as a article sorting system 100 for conveying and sorting particles.

Figure 1:
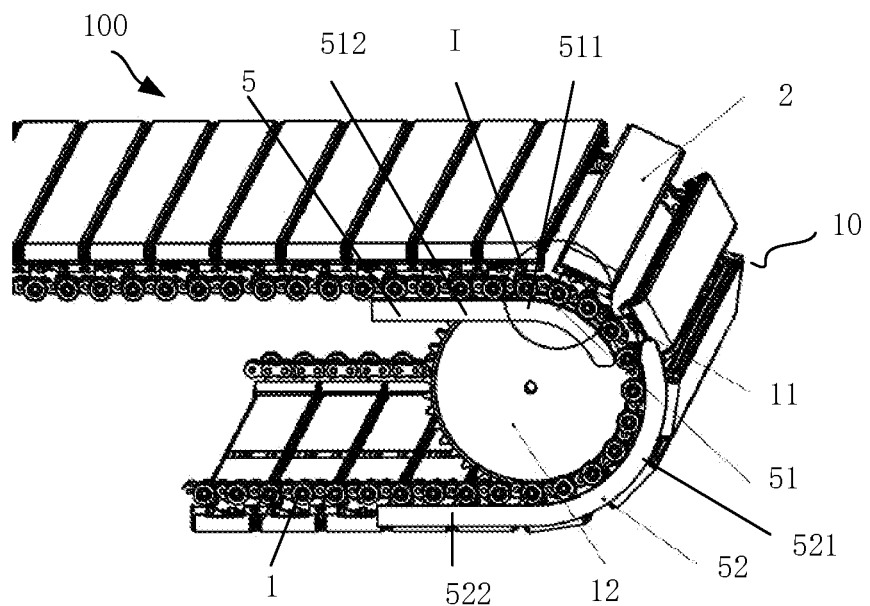
FIG. 1 is a schematic diagram of a partial structure of a chain conveying mechanism according to some embodiments of the present disclosure.

Referring to FIG. 1, the chain conveying mechanism 10 includes a chain transmission mechanism 1 and a cart 2.

The chain transmission mechanism 1 includes a chain 11 and sprockets 12. The chain 11 is wound on two chain wheels 12. One sprocket 12 serves as a drive sprocket, and the other sprocket 12 serves as a driven sprocket. In this way, the chain 11 can be driven by the sprockets 12 to rotate. In order to reduce polygon effect, vibration and wear, the chain 11 may adopt a small-pitch chain. The polygon effect refers to speed non-uniformity of chain drive caused by polygon meshing drive. The larger the pitch of the chain is, the more obvious the polygon effect is.

The cart 2 is arranged on the chain 11 and rotates together with the chain 11. The cart 2 includes a cart body 21 and two wheel groups 22 connected to two opposite sides of the cart body 21, and the wheel groups 22 are connected to the chain 11, so that the chain 11 can drag the cart 2 to rotate together. Each of the wheel groups 22 includes a first wheel 23 and a second wheel 24 which are arranged at intervals on the same side of the cart body 21. The first wheel 23 and the second wheel 24 are adjacent to each other and are arranged sequentially along a movement direction of the cart 2 on an upper layer. In other words, along the movement direction of the cart 2 on the upper layer, the first wheel 23 is located upstream of the second wheel 24, and the second wheel 24 is located downstream of the first wheel 23 and is adjacent to the first wheel 23. When the pitch of the chain 11 is small, the first wheel 23 and the second wheel 24 are connected to different chain links.

In addition, when the chain conveying mechanism 10 is applied to the article sorting system 100, the cart 2 further includes a sorting mechanism 25. The sorting mechanism 25 is arranged on the cart body 21 and is used to transversely convey an article carried by the cart 2 when the cart 2 arrives at a target sorting position, so that the article falls on the target sorting position, and the sorting process is completed. In this case, the cart 2 is a sorting cart.

During work, when the cart 2 is located between the drive chain and the driven chain, the cart 2 moves linearly. When the cart 2 moves to the drive chain or the driven chain, the cart 2 will turn and move along a circumferential direction of the sprocket 12 from one layer to another layer, thereby realizing transfer between different layers.

After research, it is found that the following two aspects are the important reasons for the low turning stability of the cart in the related art.

On the one hand, in the related art, the distance between the first wheel 23 and the second wheel 24 is fixed. In this case, during the turning process, the cart 2 cannot adapt to changes of the distance between different chain links of the chain 11, particularly the chain 11 with small pitch, therefore, it is difficult to turn stably and wear is aggravated. It can be understood that the distance between the first wheel 23 and the second wheel 24 refers to a distance between the center of the first wheel 23 and the center of the second wheel 24, which may also be referred as a wheel distance.

On the other hand, in the related art, the cart 2 is not supported and is in a suspended state in the turning process. In this case, the chain 11, the sprocket 12 and the cart 2 will be impacted greatly, thereby affecting the turning stability and increasing noise.

Based on the above findings, the present disclosure improves the structure of the chain conveying mechanism 10 so as to improve the turning stability of the cart 2, reduce wear and noise, enhance running reliability of the chain conveying mechanism 10, and prolong service life of the chain conveying mechanism 10.

For the problem of low turning stability caused by the unadjustable wheel distance, referring to FIG. 1 to FIG. 11, in some embodiments, the chain conveying mechanism 10 further includes linkage mechanisms 3. The linkage mechanisms 3 are in one-to-one correspondence with the wheel groups 22, and each of the linkage mechanisms 3 connects the chain 11, with the first wheel 23 and the second wheel 24, so that the first wheel 23 and the second wheel 24 can swing relatively, thereby changing the distance between the first wheel 23 and the second wheel 24.

Figure 2:
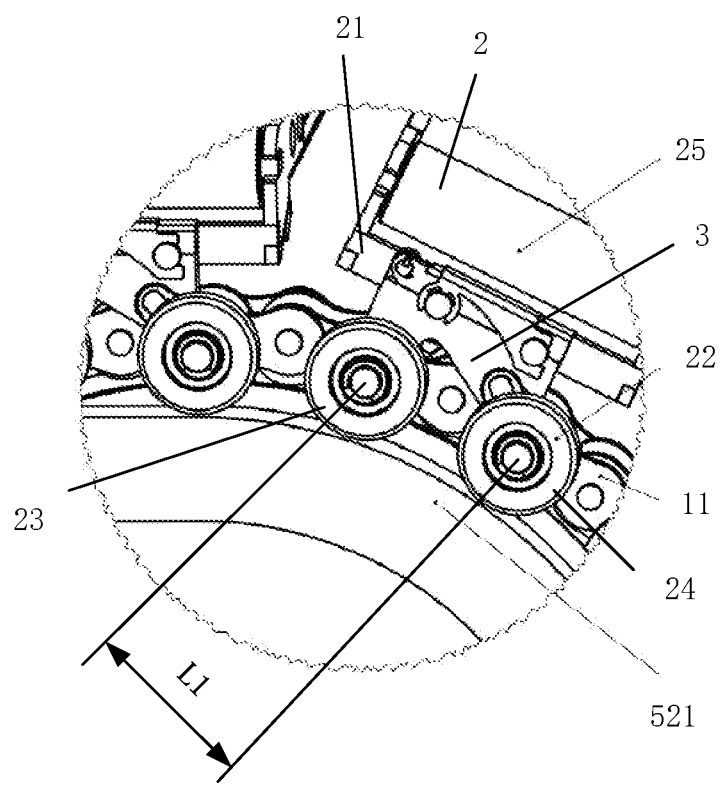
FIG. 2 is a partial enlarged view of I in FIG. 1.
Figure 3:
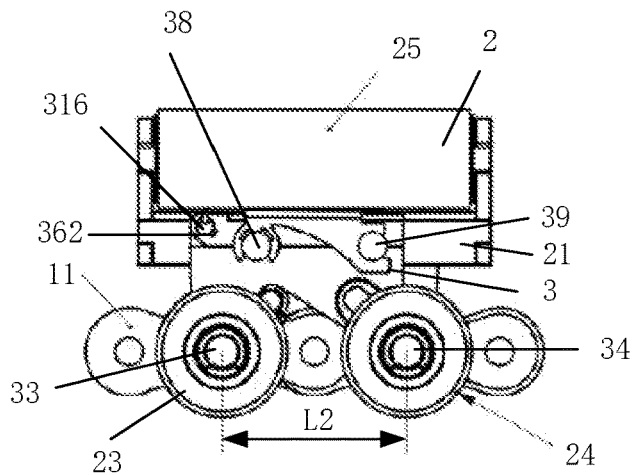
FIG. 3 is a mounting schematic diagram of a linkage mechanism.

FIG. 2 and FIG. 3 show cases where the cart 2 turns and does not turn respectively. It can be seen by comparing FIG. 2 and FIG. 3 that compared with the case where the cart 2 does not turn, when the cart 2 turns, the distance between different chain links connected to the first wheel 23 and the second wheel 24 will be reduced. At this time, if the distance between the first wheel 23 and the second wheel 24 is fixed and does not decrease accordingly, the cart 2 cannot turn successfully, and the turning stability is poor, which is why the pitch of the chain 11 in the related art is difficult to further reduced. Furthermore, the pitch of the chain 11 is difficult to further reduced, resulting in that it is difficult to further improve the polygon effect.

By setting the linkage mechanism 3, the first wheel 23 and the second wheel 24 can swing relative to each other, and the distance between them can be changed to to adapt to the change of the distance between different chain links connected to the first wheel 23 and the second wheel 24 in the turning process, thereby effectively improving the turning stability and realizing a smoother turning process. For example, as shown in FIG. 3, when the cart 2 does not turn, the linkage mechanism 3 make the first wheel 23 and the second wheel 24 not swing relatively, and the distance is L2, while as shown in FIG. 2, when the cart 2 starts to turn from top to bottom, the linkage mechanism 3 make the first wheel 23 and the second wheel 24 swing relatively, and the distance is reduced from L2 to L1, so that the distance between the first wheel 23 and the second wheel 24 is reduced along with the reduction of the distance between the chain links connected with the first wheel 23 and the second wheel 24, thereby realizing a smoother turning process.

As an implementation of the linkage mechanisms 3, referring to FIG. 3 to FIG. 11, the linkage mechanism 3 includes a supporting base 31, a swing arm 32, a first shaft 33 and a second shaft 34. The supporting base 31 is located between the chain 11 and the wheel group 22, and is connected to the cart body 21. The first shaft 33 passes through the supporting base 31, and connects the chain 11 with the first wheel 23. A first end of the swing arm 32 is connected to the supporting base 31 in a swinging manner. The second shaft 34 passes through a second end, opposite to the first end, of the swing arm 32, and connects the chain 11 with the second wheel 24.

Based on the above arrangement, when the distance between the chain links connected to the first wheel 23 and the second wheel 24 changes, the second wheel 24 drives the first end of the swing arm 32 to swing through the second shaft 34, so that the second wheel 24 swings relative to the first wheel 23, and the wheel distance between the first wheel 23 and the second wheel 24 is changed to adapt to the change of the distance between the chain links connected to the first wheel 23 and the second wheel 24. It can be seen that the linkage mechanism 3 enables the wheel distance to change along with the change of the distance between the chain links connected to the first wheel 23 and the second wheel 24, so that the wheel distance is automatically adjusted to be consistent with the distance between the chain links connected to the first wheel 23 and the second wheel 24 in the turning process, thereby realizing a stabler and smoother turning process.

In order to realize the swinging connection between the first end of the swing arm 32 and the supporting base 31, referring to FIG. 4 to FIG. 11, in some embodiments, the linkage mechanism 3 includes a swing shaft 35, the swing shaft 35 is rotatably connected to the supporting base 31, and the swing shaft 35 and the first end of the swing arm 32 are connected in a non-rotatable manner. In this way, the swing shaft 35 rotates relative to the supporting base 31, so that the first end of the swing arm 32 swings relative to the supporting base 31.

The non-rotatable connection between the swing shaft 35 and the first end of the swing arm 32 may be realized by configuring the swing shaft 35 and the swing arm 32 as an integrated structure, or may be realized by other manners. For example, referring to FIG. 4 to FIG. 6 and FIG. 9 to FIG. 11, in some embodiments, the first end of the swing arm 32 is provided with a connecting hole 321, one end, away from the cart body 21, of the connecting hole 321 is oblong, the swing shaft 35 includes an oblong part 352, and the oblong part 352 cooperates with one end, away from the cart body 21, of the connecting hole 321. A straight surface of the oblong part 352 cooperates with a straight surface of the connecting hole 321 to limit the relative swing between the swing shaft 35 and the first end of the swing arm 32, so that the swing shaft 35 and the first end of the swing arm 32 are connected in a non-rotatable manner.

Figure 7:
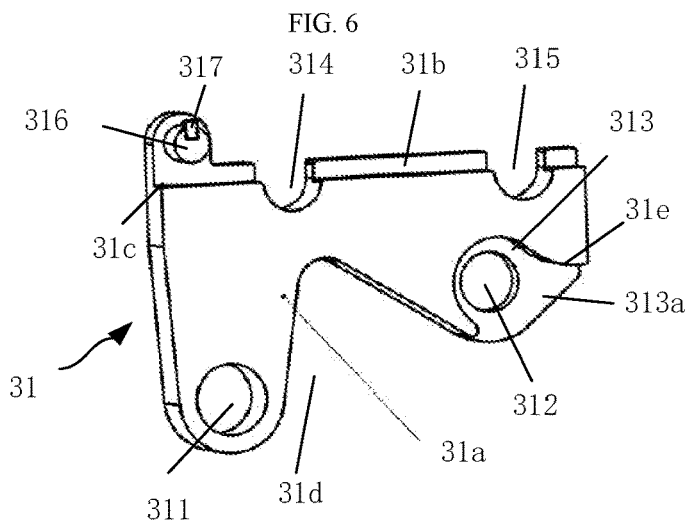
FIG. 7 is a first three-dimensional diagram of a supporting base.

In addition, referring to FIG. 7, in some embodiments, the supporting base 31 is provided with a limiting part 31e, and the limiting part 31e limits a swinging displacement of the swing arm 32. By setting the limiting part 31e to limit the swinging displacement of the swing arm 32, the swing arm 32 can be prevented from driving the second wheel 24 to rotate excessively, so that the linkage mechanisms 3 can control the wheel distance within a required range more accurately.

The forms of the limiting part 31e may be varied. For example, still referring to FIG. 7, in some embodiments, the limiting part 31e includes a limiting groove 313, a side wall of the limiting groove 313 is provided with a notch 313a, the first end of the swing arm 32 is accommodated in the limiting groove 313, and the second end of the swing arm 32 extends out from the notch 313a. The side wall of the limiting groove 313 limits the swinging displacement of the swing arm 32.

The limiting groove 313 prevents the swing arm 32 from continuing to swing by using the side wall at the notch 313a to abut against the swing arm 32 when the swing arm 32 swings to a limit position, thereby limiting the swinging displacement of the swing arm 32. At the same time, the limiting groove 313 does not affect the connection between the second end of the swing arm 32 and the second shaft 34. In addition, the limiting groove 313 is also beneficial to prevent the first end of the swing arm 32 from protruding out of the supporting base 31, thereby reducing a size of the linkage mechanisms 3 in a thickness direction of the supporting base 31, and improving a surface flatness of the linkage mechanisms 3.

As mentioned above, the supporting base 31 is connected to the cart body 21. As a manner to realize the connection between the supporting base 31 and the cart body 21, referring to FIG. 3, in some embodiments, the linkage mechanism 3 includes a third shaft 38 and a fourth shaft 39, and the supporting base 31 is connected to the cart body 21 through the third shaft 38 and the fourth shaft 39.

Specifically, referring to FIG. 3 to FIG. 8, in some embodiments, the supporting base 31 is provided with a connecting column 316, a first hole part 314 and a second hole part 315, and the linkage mechanism 3 includes a cooperation base 36 and a limiting piece 37. The cooperation base 36 is provided with a through hole 361, a third hole part 363 and a fourth hole part 364. The connecting column 316 is inserted into the through hole 361 in a non-rotatable manner. The third hole part 363 cooperates with the first hole part 314 to form a closed first mounting hole 36a. The fourth hole part 364 cooperates with the second hole part 315 to form a closed second mounting hole 36b. The third shaft 38 and the fourth shaft 39 are respectively inserted into the first mounting hole 36a and the second mounting hole 36b. The limiting piece 37 limits axial displacements of the third shaft 38 and the fourth shaft 39.

Under the action of the limiting piece 37, the connecting column 316 and the through hole 361, the cooperation base 36 and the supporting base 31 cannot move or rotate relatively, and can be stably connected to form the first mounting hole 36a and the second mounting hole 36b for the third shaft 38 and the fourth shaft 39 to insert. Furthermore, under the action of the limiting piece 37, the third shaft 38 and the fourth shaft 39 cannot be separated from the first mounting hole 36a and the second mounting hole 36b, so that the cart body 21 and the supporting base 31 are reliably connected.

In order to limit the relative rotation of the connecting column 316 and the through hole 361, referring to FIG. 3, FIG. 5, FIG. 7 and FIG. 8, in some embodiments, the connecting column 316 is provided with a protruded part 317 extending towards a radial outer side of the connecting column 316 from the connecting column 316, the through hole 361 is provided with a groove 362 being recessed towards a radial outer side of the through hole 361 from a side wall of the through hole 361, and the protruded part 317 is embedded into the groove 362. In this way, based on the cooperation between the protruded part 17 and the groove 362, the relative rotation of the connecting column 316 and the through hole 361 is limited. To clearly show the groove 362, in FIG. 2, FIG. 3 and FIG. 6, the protruded part 317 is not located in the groove 362.

Figure 5:
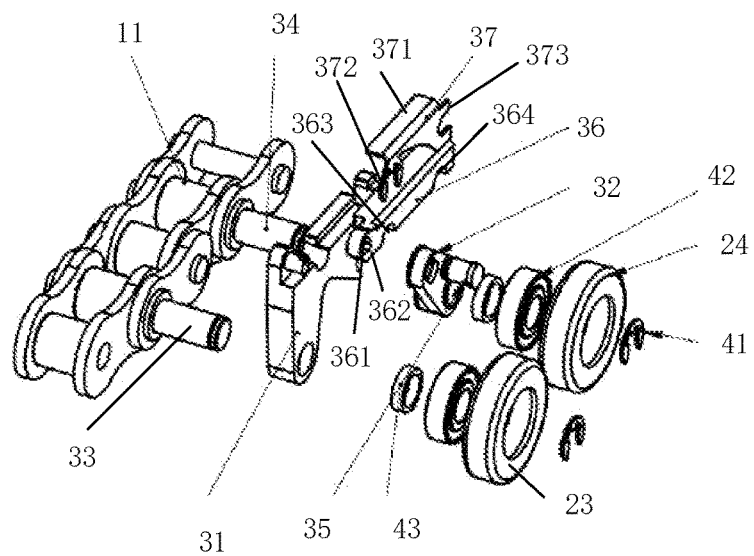
FIG. 5 is an exploded view of FIG. 4.
Figure 6:
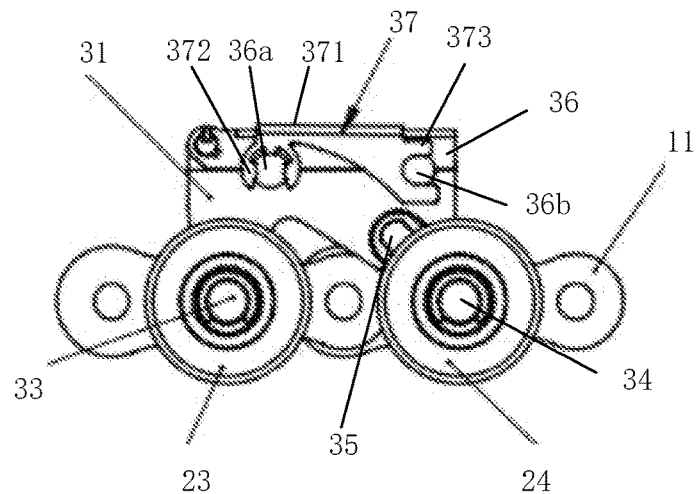
FIG. 6 is a front view of FIG. 4.

As a structural form of the limiting piece 37, referring to FIG. 5 and FIG. 6, the limiting piece 37 includes a body portion 371, a first clamping ring 372 and a second clamping ring 373. The body portion 371 is clamped on the cooperation base 36. The first clamping ring 372 and the second clamping ring 373 are arranged on the body portion 371, and are respectively clamped on the third shaft 38 and the fourth shaft 39. In this way, the limiting piece 37 can not only realize clamping connection with the cooperation base 36, but also limit the axial displacement of the third shaft 38 and the fourth shaft 39 through the first clamping ring 372 and the second clamping ring 373, and also limit the relative displacement between the cooperation base 36 and the supporting base 31 along an axial direction of the third shaft 38.

In addition, as to the turning stability problem caused by the suspension of the cart 2 in the turning process, referring to FIG. 1 and FIG. 2, in some embodiments, the chain conveying mechanism 10 includes a guide rail 5, the guide rail 5 is arranged at the sprocket 12 and bears the wheel group 22 when the cart 2 turns along a circumferential direction of the sprocket 12.

The guide rail 5 can bear the wheel group 22 when the cart 2 turns to support the cart 2, therefore, the problem of low turning stability caused by the suspension of the cart 2 can be improved, thereby enhancing the turning stability of the cart 2, and reducing impact on the chain 11, the sprocket 12 and the cart 2 and the noise.

The guide rail 5 may bear the wheel group 22 only in the partial turning process of the cart 2, or the guide rail 5 may bear the wheel group 22 in the whole turning process of the cart 2, thereby realizing a more stable turning process.

For example, referring to FIG. 1, in some embodiments, the guide rail 5 includes a first track 51. The first track 51 is located between the sprocket 12 and the chain 11, and is at least partially located above the center of the sprocket 12. Furthermore, the first track 51 includes a first arc-shaped section 511, and the first arc-shaped section 511 extends along the circumferential direction of the sprocket 12. Based on the arrangement, when the cart 2 is located at a first half of turning from top to bottom, or at a second half of turning from bottom to top, the wheel group 22 of the cart 2 is pressed on the first arc-shaped section 511 and is supported by the first arc-shaped section 511, thereby preventing the cart 2 from being suspended and improving the stability of the corresponding turning process. The first half and the second half do not necessarily account for half of the turning process, that is, the turning angles are not necessarily 90°, but maybe one of the first half and the second half is longer, and the other one is shorter, that is, the turning angle corresponding to one of the first half and the second half is greater than 90°, and the other one is less than 90°.

For another example, referring to FIG. 1, in some embodiments, the guide rail 5 includes a second track 52. The second track 52 is located on one side, away from the sprocket 12, of the chain 11, and is at least partially located below the center of the sprocket 12. Furthermore, the second track 52 includes a second arc-shaped section 521, and the second arc-shaped section 521 extends along the circumferential direction of the sprocket 12. Based on the arrangement, when the cart 2 is located at the first half of turning from bottom to top, or at the second half of turning from top to bottom, the wheel group 22 of the cart 2 is pressed on the second arc-shaped section 521 and is supported by the second arc-shaped section 521, thereby preventing the cart 2 from being suspended and realizing a stable turning process.

For another example, referring to FIG. 1, in some embodiments, the guide rail 5 includes both the first track 51 and the second track 52, and the first arc-shaped section 511 and the second arc-shaped section 521 are staggered in the circumferential direction of the sprocket 12. In this way, the guide rail 5 bears the wheel group 22 in the whole turning process of the cart 2 and continuously support the cart 2 in the turning process, thereby improving the stability of the whole turning process.

The embodiments shown in FIG. 1 to FIG. 11 are further described below.

As shown in FIG. 1 to FIG. 11, in the embodiment, the chain conveying mechanism 10 includes a chain transmission mechanism 1, a cart 2, linkage mechanisms 3 and a guide rail 5.

The chain transmission mechanism 1 is configured to drive the carts 2 and includes a chain 11 and sprockets 12. The chain 11 is wound on the sprockets 12 and is driven by the sprockets 12 to rotate.

The cart 2 is a sorting cart, and includes a cart body 21, wheel groups 22 and a sorting mechanism 25. The wheel groups 22 and the sorting mechanism 25 are arranged on the cart body 21 and are respectively configured to realize the walking and sorting functions of the cart 2. The sorting mechanism 25 includes a belt drive mechanism, a conveying direction of the belt drive mechanism intersects with (for example, perpendicular to) a conveying direction of the chain 11, so that articles on the belt drive mechanism are unloaded from the cart 2 to complete sorting. Two wheel groups 22 are arranged on two opposite sides of the cart body 21. Each wheel group 22 includes a first wheel 23 and a second wheel 24 arranged on the same side of the cart body 21 and sequentially arranged along the conveying direction of the chain. The wheel groups 22 are connected to the chain 11, so that the chain 11 drags the cart 2 to rotate together when rotating. The first wheel 23 and the second wheel 24 of the same wheel group 22 are connected to different chain links.

The linkage mechanisms 3 are arranged between the chain 11 and the wheel groups 22, and are in one-to-one correspondence with the wheel groups 22 to realize connection between the chain 11 and the wheel groups 22, and enable the first wheels 23 and the second wheels 24 to swing relatively along with the change of the distance between the chain links connected to the first wheels 23 and the second wheels 24, thereby adjusting the wheel distance to be consistent with the chain links connected to the first wheels 23 and the second wheels 24.

As shown in FIG. 2 to FIG. 11, in the embodiment, each of the linkage mechanisms 3 includes a supporting base 31, a swing arm 32, a swing shaft 35, a cooperation base 36 and a limiting piece 37.

The supporting base 31 is connected to the cart body 21, and is connected to the chain 11, the first wheel 23 and the swing arm 32. The supporting base 31 is connected to the chain 11 and the first wheel 23 through the first shaft 33, is connected to the swing arm 32 through the swing shaft 35, and is connected to the cart body 21 through the third shaft 38 and the fourth shaft 39.

Figure 8:
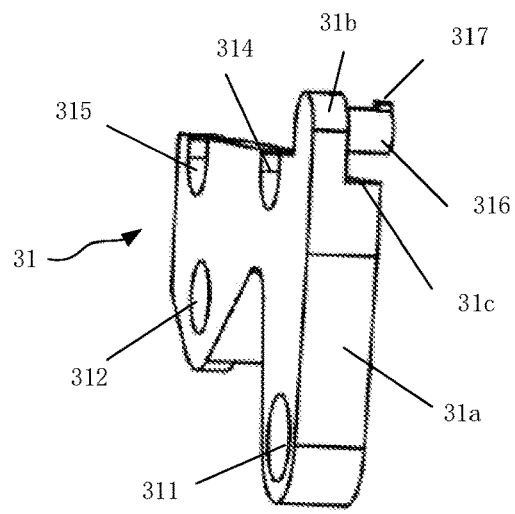
FIG. 8 is a second three-dimensional diagram of a supporting base.

Specifically, as shown in FIG. 7 to FIG. 8, in the embodiment, the supporting base 31 includes a first base body 31a and a second base body 31b. The second base body 31b is connected to a top of the first base body 31a; a surface, facing the cart body 21, of the second base body 31b is flush with a surface, facing the cart body 21, of the first base body 31a; and a thickness of the second base body 31b is less than that of the first base body 31a, so that a step 31c is formed between a surface, away from the cart body 21, of the second base body 31b and a surface, away from the cart body 21, of the first base body 31a.

The second base body 31b is provided with a connecting column 316, and a first hole part 314 and a second hole part 315 are arranged at a position where the second base body 31b is connected to the first base body 31a. The connecting column 316 extends along a thickness direction of the second base body 31b; and the connecting column 316 is provided with a protruded part 317 extending towards a radial outer side, for realizing connection between the supporting base 31 and the cooperation base 36, and limiting relative rotation of the supporting base 31 and the cooperation base 36. The first hole part 314 and the second hole part 315 are arranged at intervals, axes of the first hole part 314 and the second hole part 315 are along a thickness direction of the supporting base 31, and upward parts of side walls of the first hole part 314 and the second hole part 315 are open, so that the first hole part 314 and the second hole part 315 are non-closed holes for cooperating with the cooperation base 36 to form a closed first mounting hole 36a and a second closed mounting hole 36b for the third shaft 38 and the fourth shaft 39 to pass through. As shown in FIG. 3, one end of the third shaft 38 and one end of the fourth shaft 39 are both connected to the cart body 21, and the other end of the third shaft 38 and the other end of the fourth shaft 39 respectively pass through the first mounting hole 36a and the second mounting hole 36b and then are stopped by the limiting piece 37 to realize connection between the supporting base 31 and the cart body 21.

Figure 4:
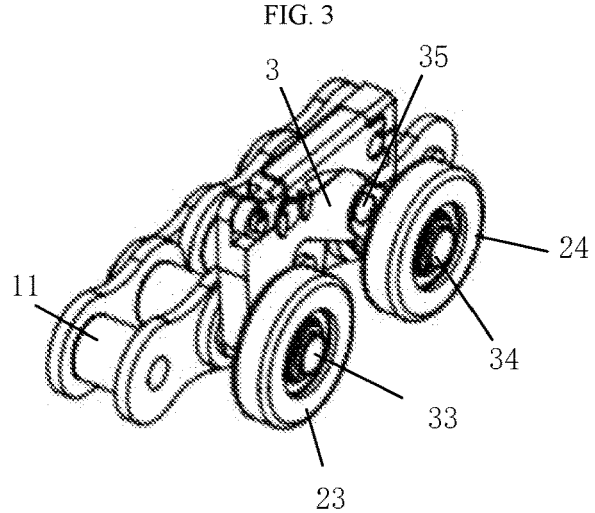
FIG. 4 is a three-dimensional diagram of a combined structure of the linkage mechanism with a chain and a wheel group.

FIG. 4 to FIG. 6 show the structure of the cooperation base 36 and the limiting piece 37. As shown in FIG. 4 to FIG. 6, in the embodiment, the cooperation base 36 is provided with a through hole 361, a groove 362, a third hole part 363 and a fourth hole part 364. An axis of the through hole 361 is along the thickness direction of the cooperation base 36 for the connecting column 316 to insert. The groove 362 is recessed towards a radial outer side of the through hole 361 from a side wall of the through hole 361 for the protruded part 317 to insert. The limiting piece 37 is configured as a spring clip, including a body portion 371, a first clamping ring 372 and a second clamping ring 373. The body portion 371 is roughly L-shaped and clamped at a top of the cooperation base 36. The first clamping ring 372 and the second clamping ring 373 are both connected to the body portion 371 and are spaced apart from each other. A side wall of the first clamping ring 372 is open towards a side away from the body portion 371. A side wall of the second clamping ring 373 is open towards a side away from the first clamping part 372.

When being assembled with the supporting base 31, the cooperation base 36 is placed on the step 31c and supported by the step 31c; meanwhile, the connecting column 316 is inserted into the through hole 361, and the protruded part 317 is embedded into the groove 362, so that the cooperation base 36 and the supporting base 31 are prevented from rotating relatively, at this time, the third hole part 363 and the fourth hole part 364 respectively abut with the first hole part 314 and the second hole part 315 to form a closed first mounting hole 36a and a closed second mounting hole 36b; then, the limiting piece 37 is clamped on the cooperation base 36, so that the first clamping ring 372 and the second clamping ring 373 respectively surround peripheries of the first mounting hole 36a and the second mounting hole 36b and are respectively clamped in shaft grooves 353 of the third shaft 38 and the fourth shaft 39, thereby preventing the third shaft 38 and the fourth shaft 39 from coming out and preventing the supporting base 31 and the cooperation base 36 from being disengaged in the thickness direction.

The first base body 31a is provided with a first shaft hole 311, a swing shaft hole 312, an avoidance groove 31d and a limiting groove 313. The first shaft hole 311 and the swing shaft hole 312 are arranged at intervals and are respectively for the first shaft 33 and the swing shaft 35 to pass through. As shown in FIG. 5 to FIG. 6, one end of the first shaft 33 is connected to the chain 11, and the other end of the first shaft 33 passes through the first shaft hole 311 and then is inserted into the first wheel 23 and stopped by a shaft clip 41, thereby realizing connection between the chain 11 and the first wheel 23. A bearing 42 and a washer 43 which are sleeved on the first shaft 33 are arranged between the first wheel 23 and the supporting base 31, thereby facilitating rotation of the first shaft 33. One end of the swing shaft 35 is connected to the swing arm 32, and the other end of the swing shaft 35 passes through the swing shaft hole 312 and is stopped by the shaft clip 41, thereby realizing connection between the supporting base 31 and the first end of the swing arm 32. The avoidance groove 31d is arranged between the first shaft hole 311 and the swing shaft hole 312, is roughly V-shaped and is used to avoid other structures so as to avoid interference. The limiting groove 313 is annularly arranged at a periphery of the swing shaft hole 312 for accommodating the first end of the swing arm 32 and limiting the swinging displacement of the swing arm 32. A side wall of the limiting groove 313 is an arc-shaped surface, and a part, facing the second wheel 24, of the side wall is open to form a notch 313a. The first end of the swing arm 32 is embedded into the limiting groove 313 in a swinging manner, and the second end of the swing arm 32 extends out of the notch 313a and is connected to the chain 11 and the second wheel 24 through the second shaft 34. In this way, when swinging to the edges of two sides of the notch 313a, the swing arm 32 is blocked by the side wall of the limiting groove 313 and cannot swing continuously, thereby limiting the swinging displacement of the swing arm 32 and preventing the swing arm 32 from excessively swinging.

Figure 9:
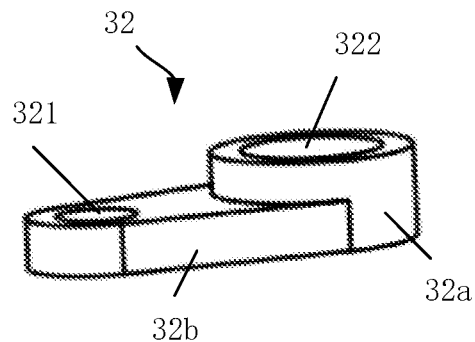
FIG. 9 is a first three-dimensional diagram of a swing arm.
Figure 10:
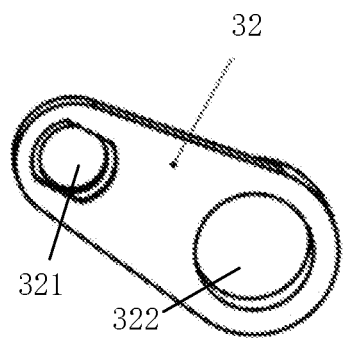
FIG. 10 is a second three-dimensional diagram of a swing arm.

FIG. 9 to FIG. 10 show the structure of the swing arm 32. As shown in FIG. 9 to FIG. 10, in the embodiment, the supporting base 32 includes a column body part 32a and an extending part 32b. The column body part 32a extends along the thickness direction of the swing arm 32. The extending part 32b is connected to a side wall of the column body part 32a, and the extending part 32b and the column body part 32a respectively form the first end and the second end of the swing arm 32. A surface, away from the cart body 21, of the extending part 32b is flush with a surface, away from the cart body 21, of the column body part 32a, and a thickness of the extending part 32b is less than that of the column body part 32a, such that the column body part 32a protrudes towards one side of the cart body 21 relative to the extending part 32b. The column body part 32a is provided with a second shaft hole 322 for the second shaft 34 to pass through. One end of the second shaft 34 is connected to the chain 11, and the other end of the second shaft 34 passes through the second shaft hole 322 and then is inserted into the second wheel 24 and stopped by the shaft clip 41, thereby realizing connection between the chain 11 and the second wheel 24. A bearing 42 and a washer 43 which are sleeved on the second shaft 34 are arranged between the second wheel 24 and the column body part 32a, thereby facilitating rotation of the second shaft 34. The extending part 32b is provided with a connecting hole 321 for the swing shaft 35 to pass through, thereby realizing connection between the swing shaft 35 and the first end of the swing arm 32.

Figure 11:
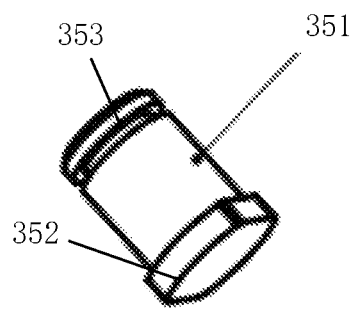
FIG. 11 is a three-dimensional diagram of a swing shaft.

FIG. 11 shows the structure of the swing shaft 35. As shown in FIG. 11, in this embodiment, the swing shaft 35 includes a shaft body 351, and an oblong part 352 connected to one end of the shaft body 351. The shaft body 351 is cylindrical; and a shaft groove 353 is formed at one end, away from the oblong part 352, of the shaft body 351 for mounting the shaft clip 41. The cross section of the oblong part 352 is oblong. Correspondingly, one end, away from the cart body 21, of the connecting hole 321 is oblong. In this way, as shown in FIG. 6, when the swing shaft 35 is inserted into the connecting hole 321, the shaft body 351 passes through the connecting hole 321, is inserted into the swing shaft hole 312 and passes through the swing shaft hole 312, the oblong part 352 is clamped at one end, away from the cart body 21, of the connecting hole 321, and an arc-shaped surface of the oblong part 352 is in contact with an arc-shaped surface of one end, away from the cart body 21, of the connecting hole 321, at the same time, a straight surface of the oblong part 352 is in contact with a straight surface of one end, away from the cart body 21, of the connecting hole 321, so that the swing shaft 35 and the swing arm 32 cannot rotate relatively, and the swing arm 32 can be driven to swing relative to the supporting base 31 when the swing shaft 35 rotates in the swing shaft hole 312.

When the chain 11 and the wheel groups 22 are connected by the linkage structures 3, the first shaft 33 arranged on the chain 11 passes through the first shaft hole 311 on the supporting base 31 and be inserted into the first wheel 23, the swing shaft 35 sequentially passes through the connecting hole 321 at the first end of the swing arm 32 and the swing shaft hole 312 on the supporting base 31, and the second shaft 34 arranged on the chain 11 passes through the second shaft hole 322 at the second end of the swing arm 32 and is inserted into the second wheel 24. In this way, when the cart turns and the distance between the chain links connected to the first wheel 23 and the second wheel 24 changes, the swing arm 32 drives the second wheel 24 to swing relative to the first wheel 23, thereby correspondingly changing the wheel distance.

The guide rail 5 is configured to bear the wheel groups 22 in the turning process of the cart 2 so as to support the cart 2. As shown in FIG. 1, in this embodiment, the guide rail 5 includes a first track 51 and a second track 52. The first track 51 is located between the sprocket 12 and the chain 11, and located above the center of the sprocket 12. The second track 52 is located on one side, away from the sprocket 12, of the chain 11, and extends upward from the position below the center of the sprocket 12 to the position above the center of the sprocket 12.

Specifically, the first track 51 includes a first arc-shaped section 511 and a first straight section 512. The first arc-shaped section 511 extends downward along the circumferential direction of the sprocket 12 from the position just above the center of the sprocket 12. The first straight section 512 is connected to one end, away from an outer side of the sprocket 12, of the first arc-shaped section 511. The outer side of the sprocket 12 refers to one side, away from the other sprocket 12, of the sprocket 12. The first straight section 512 is connected to one end, away from the outer side of the sprocket 12, of the first arc-shaped section 511, which means that the first straight section 512 extends from the first arc-shaped section 511 to the other sprocket 12.

In addition, the second track 52 includes a second arc-shaped section 521 and a second straight section 522. The second arc-shaped section 521 extends upward along the circumferential direction of the sprocket 12 from the position just under the center of the sprocket 12 until the second arc-shaped section 521 extends to the position above the center of the sprocket 12, and the second arc-shaped section 521 and the first arc-shaped section 511 are staggered in the circumferential direction of the sprocket 12. The second straight section 522 is connected to one end, away from the outer side of the sprocket 12, of the second arc-shaped section 521. In other words, the second straight section 522 extends from the second arc-shaped section 521 to the other sprocket 12.

Based on the above arrangement, the guide rail 5 continuously supports the cart 2 in the turning process of the cart 2. When the cart 2 turns to an upper position and the weight of the cart 2 presses a radial inner side of the sprocket 12, the first arc-shaped section 511 supports the wheel groups 22, so as to support the cart 2 and prevent the cart 2 from being suspended; and when the cart 2 turns to a lower position and the weight of the cart 2 presses a radial outer side of the sprocket 12, the second arc-shaped section 521 supports the wheel groups 22, so as to support the cart 2 and prevent the cart 2 from being suspended. It can be seen that in the whole turning process of the cart 2 along the circumferential direction of the sprocket 12, the wheel groups 22 of the cart 2 are always restrained by the guide rail 5, thereby realizing good transition of the cart 2 and reducing impact and noise.

The first straight section 512 and the second straight section 522 are arranged on the basis of the first arc-shaped section 511 and the second arc-shaped section 521, which is beneficial to guide the wheel groups 22 to go up and down the first arc-shaped section 511 and the second arc-shaped section 521 smoothly, thereby realizing a more stable conveying process.

In this embodiment, the chain conveying mechanism 10 can effectively improve the turning stability of the cart 2 under the action of the linkage mechanisms 3 and the guide rail 5. Taking the turning process of the cart 2 from top to bottom as an example, as shown in FIG. 1 and FIG. 2, at the initial stage of the cart 2 turning downwards, the wheel groups 22 of the cart 2 press on the first arc-shaped section 511; then when the cart continuously turns downwards, the wheel groups 22 press on the second arc-shaped section 521, so that in the whole turning process, the wheel groups 22 are supported by the guide rail 5, and the impact on the chain 11, the sprocket 12 and the cart 2 is reduced, furthermore, in the downward turning process of the cart 2, the distance between the chain links connected to the first wheel 23 and the second wheel 24 is increased first and then reduced, so that the swing arms 32 of the linkage mechanisms 3 swing towards the left lower part and then swing towards the right upper part, which not only realize adjustment of the wheel distance, such that the distance between the first wheel 23 and the second wheel 24 is reduced from L2 to L1 and then is increased from L1 to L2, but also makes the wheel groups 22 always keep in contact with the guide rail 5 and is continuously supported by the guide rail 5, thereby realizing a stable turning process with small vibration, small impact and low noise.

The turning stability of the cart 2 is improved, therefore, it is beneficial to reduce wear and noise, improve the running reliability of the chain conveying mechanism 10 and the article sorting system 100, and prolong the service life of the chain conveying mechanism 10 and the article sorting system 100.

Meanwhile, the wheel distance of the cart 2 can adapt to the change of the distance between different chain links under the action of the linkage mechanisms 3, so it is also beneficial to further reduce the pitch of the chain 11 and the polygon effect of the chain 11.

The descriptions above are only exemplary embodiments of the present disclosure, but are not intended to limit the present disclosure; and any modifications, equivalent substitutions, improvements and the like made within the spirit and principles of the present disclosure are all intended to be concluded in the protection scope of the present disclosure.

The invention claimed is:

1. A chain conveying device, comprising:
   a chain transmission mechanism, comprising a chain and a sprocket, wherein the chain is configured to be driven by the sprocket to rotate;
   a cart, arranged on the chain and rotatable along with the chain, wherein the cart comprises a cart body and two wheel groups connected to two opposite sides of the cart body, and each of the wheel groups comprises a first wheel and a second wheel arranged at intervals on the same side of the cart body; and
   linkage mechanisms being in one-to-one correspondence with the wheel groups, wherein each of the linkage mechanisms connects the chain with the first wheel and the second wheel, and enables the first wheel and the second wheel to swing relative to each other to change a distance between the first wheel and the second wheel.

2. The chain conveying mechanism according to claim 1, wherein the linkage mechanism comprises a supporting base, a swing arm, a first shaft and a second shaft, the supporting base is located between the chain and the wheel group and is connected to the cart body, the first shaft passes through the supporting base and connects the chain with the first wheel, a first end of the swing arm is connected to the supporting base in a swinging manner, and the second shaft passes through a second end, opposite to the first end, of the swing arm and connects the chain with the second wheel.

3. The chain conveying mechanism according to claim 2, wherein the linkage mechanism comprises a swing shaft, the swing shaft is rotatably connected to the supporting base, and the swing shaft is connected to the first end of the swing arm in a non-rotatable manner.

4. The chain conveying mechanism according to claim 2, wherein the first end of the swing arm is provided with a connecting hole, one end, away from the cart body, of the connecting hole is oblong, the swing shaft comprises an oblong part, and the oblong part cooperates with one end, away from the cart body, of the connecting hole to realize non-rotatable connection between the swing shaft and the first end of the swing arm.

5. The chain conveying mechanism according to claim 2, wherein the supporting base is provided with a limiting part, and the limiting part limits a swinging displacement of the swing arm.

6. The chain conveying mechanism according to claim 5, wherein the limiting part comprises a limiting groove, a side wall of the limiting groove is provided with a notch, the first end of the swing arm is accommodated in the limiting groove; the second end of the swing arm extends out from the notch, and the side wall of the limiting groove limits the swinging displacement of the swing arm.

7. The chain conveying mechanism according to claim 2, wherein the linkage mechanism comprises a third shaft and a fourth shaft, and the supporting base is connected to the cart body through the third shaft and the fourth shaft.

8. The chain conveying mechanism according to claim 7, wherein the supporting base is provided with a connecting column, a first hole part and a second hole part, the linkage mechanism comprises a cooperation base and a limiting piece, the cooperation base is provided with a through hole, a third hole part and a fourth hole part, the connecting column is inserted into the through hole in a non-rotatable manner, the third hole part cooperates with the first hole part to form a closed first mounting hole, the fourth hole part cooperates with the second hole part to form a closed second mounting hole, the third shaft and the fourth shaft are respectively inserted into the first mounting hole and the second mounting hole, and the limiting piece limits axial displacements of the third shaft and the fourth shaft.

9. The chain conveying mechanism according to claim 8, wherein,
the connecting column is provided with a protruded part, the protruded part extends towards a radial outer side of the connecting column from the connecting column, the through hole is provided with a groove, the groove is recessed towards a radial outer side of the through hole from a side wall of the through hole, and the protruded part cooperates with the groove to limit relative rotation of the connecting column and the through hole; and/or, the limiting piece comprises a body portion, a first clamping ring and a second clamping ring, the body portion is clamped on the cooperation base, and the first clamping ring and the second clamping ring are arranged on the body portion and are respectively clamped on the third shaft and the fourth shaft so as to limit the axial displacement of the third shaft and the fourth shaft.

10. The chain conveying mechanism according to claim 1, comprising a guide rail, wherein the guide rail is arranged at the sprocket and bears the wheel group when the cart turns along a circumferential direction of the sprocket.

11. The chain conveying mechanism according to claim 10, wherein the guide rail comprises at least one of the following:
a first track, located between the sprocket and the chain, at least partially located above the center of the sprocket, and comprising a first arc-shaped section extending along a circumferential direction of the sprocket;
a second track, located on one side, away from the sprocket, of the chain, at least partially located below the center of the sprocket, and comprising a second arc-shaped section extending along a circumferential direction of the sprocket.

12. The chain conveying mechanism according to claim 11, wherein the guide rail comprises the first track and the second track, and the first arc-shaped section and the second arc-shaped section are staggered in the circumferential direction of the sprocket.

13. The chain conveying mechanism according to claim 11, wherein the first track comprises a first straight section, and the first straight section is connected to one end, away from an outer side of the sprocket, of the first arc-shaped section; and/or, the second track comprises a second straight section, and the second straight section is connected to one end, away from an outer side of the sprocket, of the second arc-shaped section.

14. The chain conveying mechanism according to claim 1, wherein the cart is a sorting cart.

15. An article sorting system, comprising the chain conveying mechanism according to claim 1.

* * * * *